United States Patent
Jee

(10) Patent No.: US 8,556,049 B2
(45) Date of Patent: Oct. 15, 2013

(54) DAMPING FORCE CONTROLLING VALVE ASSEMBLY FOR SHOCK ABSORBER

(75) Inventor: Young Whan Jee, Gyeonggi-do (KR)

(73) Assignee: Mando Corporation, Pyeongtaek-Si (KR)

( * ) Notice: Subject to any disclaimer, the term of this patent is extended or adjusted under 35 U.S.C. 154(b) by 62 days.

(21) Appl. No.: 13/291,649

(22) Filed: Nov. 8, 2011

(65) Prior Publication Data

US 2012/0111676 A1    May 10, 2012

(30) Foreign Application Priority Data

Nov. 8, 2010    (KR) .................. 10-2010-0110558

(51) Int. Cl.
*F16F 9/34*    (2006.01)

(52) U.S. Cl.
USPC .............. 188/322.13; 188/282.6; 188/322.15; 251/129.15; 137/625.65

(58) Field of Classification Search
USPC ........ 188/322.13, 266.4, 266.6, 282.5, 282.6, 188/322.14, 322.15, 322.2; 251/48, 50, 51, 251/55, 129.02, 129.07, 129.08, 129.15; 137/625.65
See application file for complete search history.

(56) References Cited

U.S. PATENT DOCUMENTS

| 5,163,538 | A | 11/1992 | Derr et al. | |
|---|---|---|---|---|
| 5,586,627 | A | 12/1996 | Nezu et al. | |
| 5,605,178 | A * | 2/1997 | Jennins | 137/625.65 |
| 8,220,604 | B2 * | 7/2012 | Jee et al. | 188/322.13 |
| 2008/0006493 | A1 * | 1/2008 | Jee | 188/282.5 |
| 2008/0185246 | A1 * | 8/2008 | Park | 188/322.15 |
| 2009/0211859 | A1 * | 8/2009 | Park | 188/266.6 |
| 2010/0001217 | A1 * | 1/2010 | Jee et al. | 251/129.15 |

FOREIGN PATENT DOCUMENTS

JP    1996-170679    7/1996

* cited by examiner

*Primary Examiner* — Pamela Rodriguez
(74) *Attorney, Agent, or Firm* — McDermott Will & Emery LLP

(57) ABSTRACT

A damping force controlling valve assembly for a shock absorber is provided. The damping force controlling valve assembly includes: a main body part of a retainer having an inlet passage connected to a high pressure side of the shock absorber; a main valve generating a damping force while resisting a working fluid flowing in through the inlet passage; a spool rod part interacting with a spool inserted thereinto and supplying a working fluid through a connection port to a back-pressure chamber provided at the rear of the main valve; a solenoid part controlling a position of the spool to adjust a pressure of the back-pressure chamber; and an auxiliary valve disposed at an upstream of the main valve to generate a damping force in an extremely low speed section in advance of the main valve.

3 Claims, 3 Drawing Sheets

DAMPING FORCE CONTROLLING VALVE ASSEMBLY FOR SHOCK ABSORBER

CROSS-REFERENCE(S) TO RELATED APPLICATION

This application claims priority of Korean Patent Application No. 10-2010-0110558, filed on Nov. 8, 2010, in the Korean Intellectual Property Office, which is hereby incorporated by reference in its entirety.

BACKGROUND OF THE INVENTION

1. Field of the Invention

The present invention relates to a shock absorber for a vehicle, and more particularly, to a damping force controlling valve assembly that is disposed at one side of a shock absorber to control a damping force of the shock absorber.

2. Description of the Related Art

Generally, a shock absorber is an apparatus that absorbs sudden shock or vibration. For example, the shock absorber is applied to a vehicle to quickly absorb vibration of a spring generated by a road surface during driving of the vehicle, to secure the driving safety and to provide an improved ride comfort.

During typical driving, the shock absorber reduces a damping force to absorb vibration caused by uneven road surfaces, leading to improvement in ride comfort. During turning, accelerating, braking, and high-speed driving, the shock absorber increases a damping force to control the position variation of a vehicle body, leading to improvement in handling stability.

Recent shock absorbers include a damping force controlling valve assembly at one side thereof to appropriately control the characteristics of the damping force, and have been developed to damping force variable shock absorbers that can appropriately control the characteristics of the damping force according to the conditions of driving and a road surface in order to improve ride comfort and handling stability.

Many efforts have been made to manufacture a shock absorber having excellent damping force control characteristics by improving the performance of a damping force controlling valve assembly. Korean Patent Laid-Open Publication Nos. 2010-0023074 and 2010-0007187 disclose technologies of damping force controlling valve assemblies that have been recently developed for shock absorbers.

In spite of many efforts to improve the performance of a damping force controlling valve assembly, a conventional shock absorber has a poor damping force characteristic in an extremely low speed section because the degree of freedom in tuning the damping force controlling valve assembly is low in an extremely low speed section. Conventionally, a single slit disk included in a disc valve within a damping force controlling valve assembly generates a damping force in an extremely low speed section. Therefore, a damping force curve in an extremely low speed section has a single pattern. As a result, the degree of freedom in turning a damping force in an extremely low speed section is lowered.

SUMMARY OF THE INVENTION

An aspect of the present invention is directed to a damping force controlling valve assembly for a shock absorber, which can provide an improved damping force characteristic in an extremely low speed section, as compared to a conventional damping force controlling valve assembly, thereby improving ride comfort of a vehicle.

Another aspect of the present invention is directed to solve a problem of a conventional damping force controlling valve assembly that the degree of freedom in tuning a damping force in an extremely low speed section is lowered.

According to an embodiment of the present invention, a damping force controlling valve assembly for a shock absorber includes: a main body part of a retainer having an inlet passage connected to a high pressure side of the shock absorber; a main valve generating a damping force while resisting a working fluid flowing in through the inlet passage; a spool rod part interacting with a spool inserted thereinto and supplying a working fluid through a connection port to a back-pressure chamber provided at the rear of the main valve; a solenoid part controlling a position of the spool to adjust a pressure of the back-pressure chamber; and an auxiliary valve disposed at an upstream of the main valve to generate a damping force in an extremely low speed section in advance of the main valve.

The auxiliary valve may include: a body in which a flow passage is formed to allow a working fluid flow from a high pressure side to the inlet passage; and a plurality of disks disposed under the body to cover the flow passage. At least one of the disks may be a slit disk. The auxiliary valve may include: one slit disk allowing the working fluid to pass through a slit thereof in the extremely low speed section; and one or more lower disks disposed under the slit disk and having no slit.

<Reference Numerals>

Figure 1:
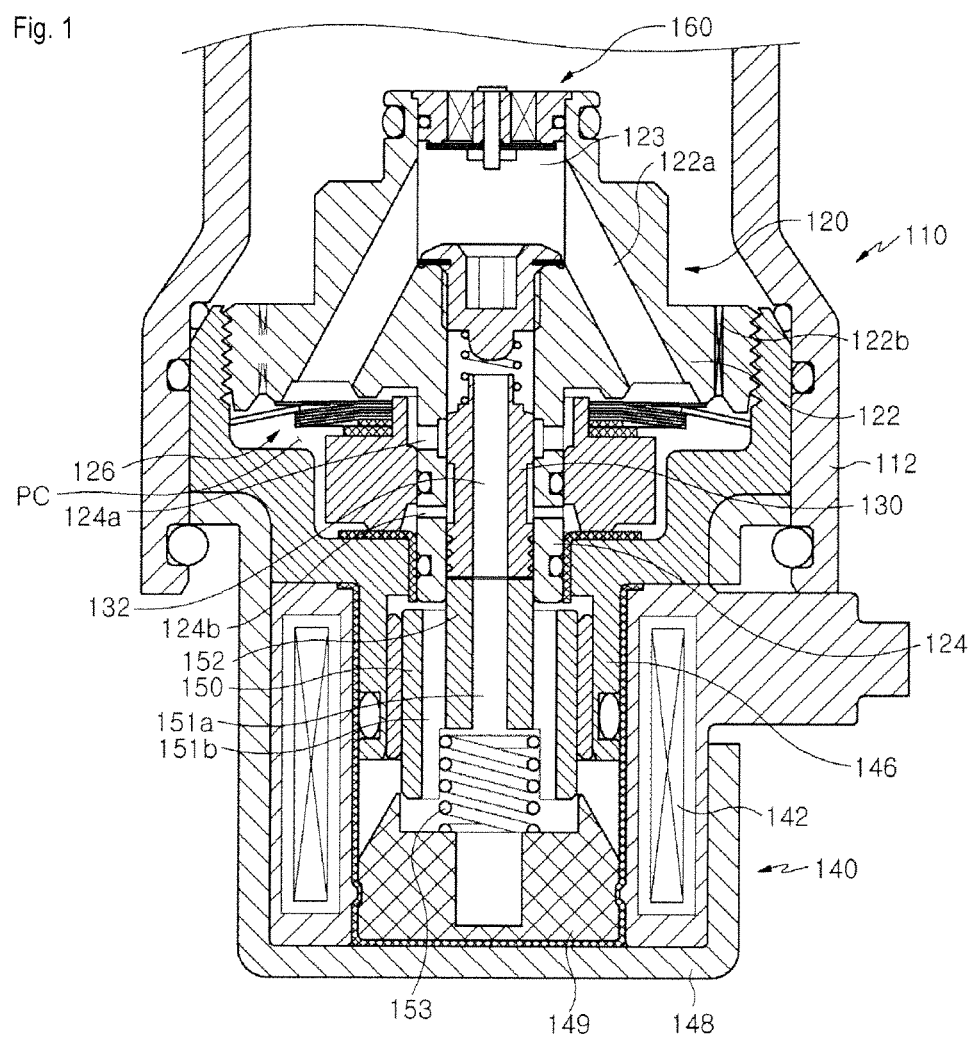
FIG. 1 is a cross-sectional view illustrating a damping force controlling valve assembly for a shock absorber according to an embodiment of the present invention.

| | |
|---|---|
| 120: retainer | 122: main body part |
| 124: spool load part | 126: main valve |
| 140: solenoid part | 160: auxiliary valve |
| 161: auxiliary valve body | 162: slit disk |
| 163: lower disk | |

DETAILED DESCRIPTION OF EXEMPLARY EMBODIMENTS

Exemplary embodiments of the present invention will be described below in detail with reference to the accompanying drawings. Throughout the disclosure, like reference numerals refer to like parts throughout the drawings and embodiments of the present invention.

FIG. 1 is a cross-sectional view illustrating a damping force controlling valve assembly for a shock absorber according to an embodiment of the present invention.

Referring to FIG. 1, a damping force controlling valve assembly 110 is disposed at one side of a shock absorber (not shown). The shock absorber includes a cylinder and a reservoir chamber that communicates with the cylinder. A high pressure side connected to a tensioning chamber of the cylinder and a low pressure side connected to the reservoir chamber are connected to the damping force controlling valve assembly 110.

The damping force controlling valve assembly 110 includes a retainer 120 disposed inside a valve housing 112, a main valve 126, and a solenoid part 140 connected under the valve housing 112.

The retainer 120 includes a main body part 122 and a spool load part 120. The spool load part 120 is integrally formed with the main body part 122.

The main body part 122 is connected to a high pressure side at the central portion and an outer diameter of the main body part 122 increases toward the outside. To this end, a connection port 123 connected to a high pressure chamber of the shock absorber is disposed at the upper portion of the main body part 122.

In addition, an inlet passage 122a connected to the connection port 123 penetrates through the main body part 122. The inlet passage 122a inclines toward the outside along the shape of the main body 122 to exhaust a working fluid passing through the inlet passage 122a to the lower side of the retainer 120.

On the other hand, the spool rod part 124 integrally extends from a lower central portion of the main body part 122. A hollow, through which a spool 130 is inserted, is formed in the central portion of the spool rod part-124. In addition, a plurality of connection ports 124a and 124b are formed in the spool rod part 124 to allow fluid to pass through. The upper connection port 124a among the plurality of connection ports guides a working fluid received from the inlet passage 122a to the inside of the spool rod part 124. The lower connection port 124b among the plurality of connection ports supplies a working fluid into a back-pressure chamber PC. The open/close pressure of the main valve 126 is controlled by the fluid supplied into the back-pressure chamber PC. The solenoid part 140, which will be described in more detail below, drives a spool pressurizing part 150 to displace the spool 130. Thus, a working fluid supplied to the back-pressure chamber PC is controlled through relative location variation of the spool rod part 124 and the spool 130 and a control of the connection port 124b. Accordingly, the pressure of the back-pressure chamber PC and the damping force by the main valve 126 can be controlled.

The main valve 126 is disposed to cover the inlet passage 122a at the rear of the retainer 120 and generate a damping force by directly resisting a working fluid passing through the inlet passage 122a. That is, the main valve 126 resists a working fluid flowing through the inlet passage 122a, and simultaneously allows the working fluid to flow into an outlet passage 122b while being bent back.

In addition, an inner slit is formed at the inner side of the main valve 126 to allow a part of working fluid passing through the inlet passage 122a to flow in a direction other than the outlet passage 122b. The inner slit communicates with the connection port at ordinary times. Also, an outer slit is formed at the outer side of the main valve 126. The outer slit communicates with the outlet passage 122b at ordinary times. The outlet passage 122b is formed in the retainer 120 to exhaust the supplied fluid to a low pressure side by allowing the main valve 126 to be bent back according to the pressure of the back-pressure chamber PC.

The main valve 126 includes a plurality of valve disks that are stacked. The valve disks generate a damping force while resisting the working fluid. The main valve 126 involves in generating the damping force from a low speed section to a high speed section. In the case of the conventional damping force controlling valve assembly, only the slit provided in the main valve 126 involves in generating the damping force at an extremely low speed section. As can be seen from the conventional damping force curve of FIG. 3B, the damping force curve has only one pattern at the low speed section.

Figure 3:
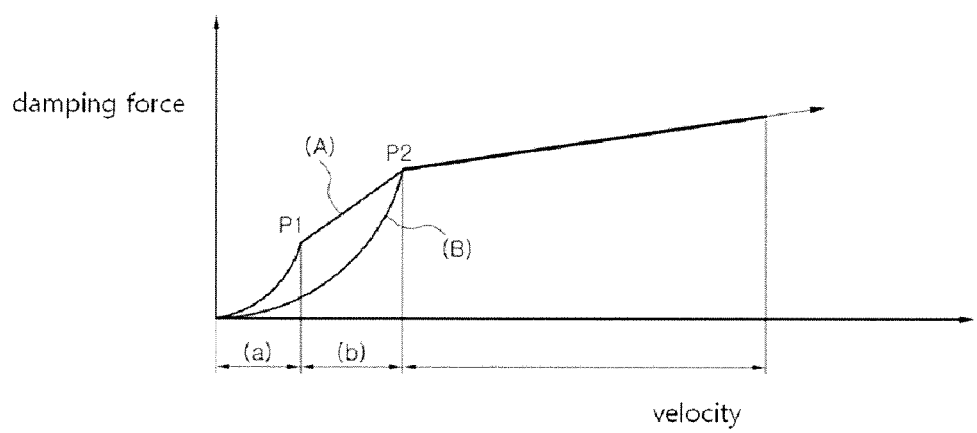
FIG. 3 is a graph illustrating comparison of a damping force curve between the damping force controlling valve assembly according to the embodiment of the present invention, which has both a main valve and an auxiliary valve, and the conventional damping force controlling valve assembly, which has only a main valve.

The damping force controlling valve assembly 110 according to the embodiment of the present invention further includes an auxiliary valve 160 for an extremely low speed section. In this embodiment, the auxiliary valve 160 for the extremely low speed section is disposed at an upstream of the main valve 126, more preferably, the connection port 123 connected to the high pressure chamber of the shock absorber. The auxiliary valve 160 involves in generating the damping force in an extremely low speed section, in advance of the main valve 126. In the case of using the damping force controlling valve assembly having the auxiliary valve 160 according to the embodiment of the present invention, the damping force curve of FIG. 3A is obtained. That is, the auxiliary valve 160 generates a fluid resistance (or an oil resistance) in an extremely low speed section. Therefore, as shown in the damping force curve of FIG. 3A, a primary blow-off P1 occurs. The damping force curve of the low speed section is determined by the auxiliary valve 160 until before a secondary blow-off P2 is generated by the main valve 126.

Figure 2:
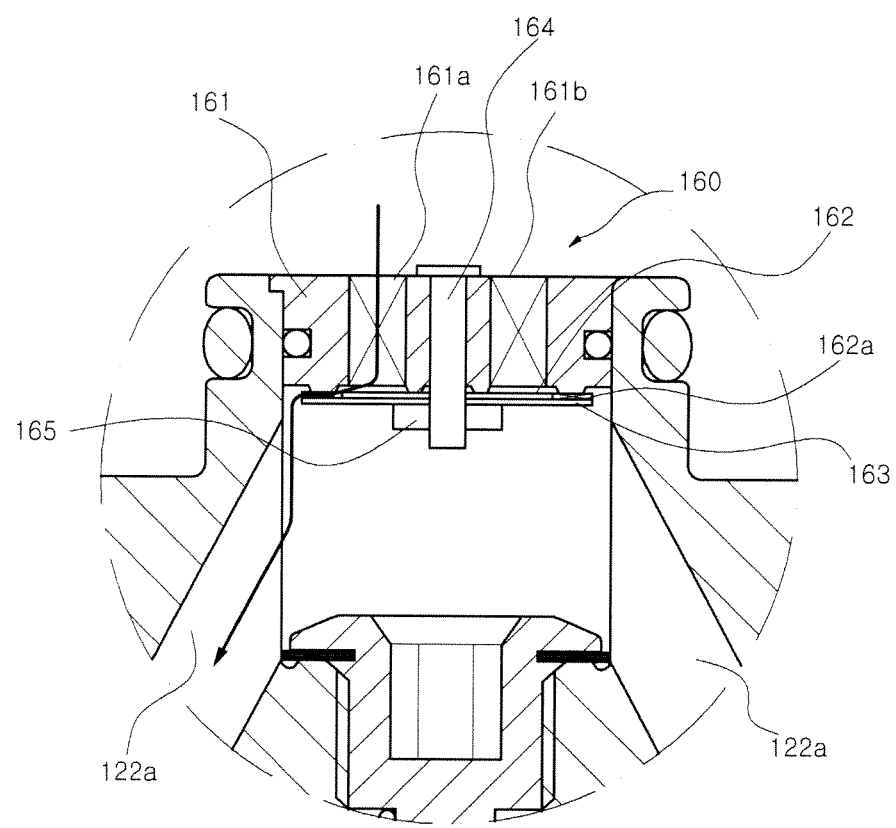
FIG. 2 is an enlarged cross-sectional view illustrating an auxiliary valve for an extremely low speed section in the damping force controlling valve assembly of FIG. 1.

Referring to FIG. 2, the auxiliary valve 160 for the extremely low speed section includes a body 161, in which flow passages 161a and 161b are formed, an upper slit disk 162, and one or more lower disk 163 having no slits. The body 161 is fixedly disposed at an inner diameter part of the connection port 123. The slit disk 162 and the lower disk 163 are disposed under the body 161. The slit disk 162 is disposed at the uppermost portion, that is, the slit disk 162 is disposed to be close to the flow passage. The disks 162 and 163 are installed using a pin 164 and a nut 165. The pin 164 penetrates through the center of the body 161 in a vertical direction, and the nut 165 is coupled to a lower portion of the pin 164. The disks 162 and 163 are disposed between the nut 165 and the lower side of the body 161. In the extremely low speed section, the damping force is generated when the working fluid is flowing through the slit 162a of the slit disk 162 while receiving resistance. The slit disk 162 and the lower disk 163 disposed under the slit disk 162 are bent back according to the increase in the speed and the flow rate, and the flow passages 161a and 161b are widely opened. Therefore, the primary blow-off P1 occurs in the extremely low speed section of the damping force curve. In the extremely low speed section (a) on the left side from the primary blow-off P1, the damping force may be varied by changing the size of the slit 162a of the disk slit 162, that is, the size of the orifice. In addition, in the low speed section (b) between the primary blow-off P1 and the secondary blow-off P2, the damping force may be varied by changing the thickness or number of the disks 163. Therefore, the damping force controlling valve assembly according to the embodiment of the present invention may increase the degree of freedom in tuning the damping force in the low speed section.

Referring again to FIG. 1, the solenoid part 140 is detachably coupled to the lower end of the valve housing 112, the upper end of which is coupled to the outer side of the shock absorber. Also, the solenoid part 140 includes a bobbin 142 on which coil is wound to generate a magnetic force according to a variation of an electric current, and a spool pressurizing part 150 disposed to be movable according to a variation of an electric current supplied to the coil wound on the bobbin 142.

In addition, a driving block 146 is provided over the solenoid part 140 to guide the spool pressurizing part 150 and finish the upper portion of the solenoid part 140. The driving block 146 includes an extension part, an outer circumferential surface of which extends upward. Furthermore, a cover part 148 is coupled to the lower end of the solenoid 140. The retainer 120 is coupled to the extension part of the driving block 146 and maintains the fixed state.

The spool pressurizing part 150 has a cylindrical shape. A rising part 152 contacting the spool 130 is formed in the center of the spool pressurizing part 150. The rising part 152 is partially inserted into the hollow part of the spool rod part 124. Also, the rising part 152 moves the spool pressurizing part 150 by a current applied to the solenoid part 140, and the spool 130 is moved while interworking with the rising part 152.

The spool 130 has a hollow flow passage 132 that penetrates through the central portion thereof. Accordingly, the working fluid is moved by a pressure difference generated during movement of the spool 130, and thus, the pressure difference is offset.

The spool pressurizing part 150 has a first flow passage 151a and a second flow passage 151b. The first flow passage 151a penetrates through the center of the rising part 152 and communicates with the hollow flow passage 132. The second flow passage 151b is formed around the rising part 152. Accordingly, a working fluid passing through the spool 130 is exhausted to the flow passage of the spool pressurizing part 150 and the first and second flow passages 151a and 151b, and offsets a back-pressure difference according to the movement of the spool pressurizing part 150.

Accordingly, vibration may not be generated during the movement of the spool pressurizing part 150, and the spool 130 contacting the spool pressurizing part 150 may be moved without vibration.

A guide part 149 is disposed inside the cover part 148. The guide part 149 elastically supports the spring 153 disposed between the cover part 148 and the spool pressurizing part 150, and guides the movement of the spool pressurizing part 150.

The spool pressurizing part 150 may be integrally formed by sintering. The spool pressurizing part 150 formed by sintering may have a plurality of air gaps inside. Oil may be contained in the air gaps. Therefore, the frictional resistance with the spool rod part 124 may be reduced during the movement of the spool pressurizing part 150.

In addition, the spool rod part 124 may be surface-treated to form hatching patterns in the inner circumferential surface thereof. Cross-hatching patterns may be formed in the spool rod part 124. Accordingly, the contact area with the spool pressurizing part 150 may be reduced, and the frictional resistance occurring during the movement of the spool pressurizing part 150 may be reduced.

According to the embodiments of the present invention, the auxiliary valve which generates the damping force in the extremely low speed section in advance of the main valve is further provided at the upstream side of the main valve, the damping force of which is variably controlled by the solenoid part. Therefore, the damping force characteristic in the extremely low speed section is further improved, and thus, the ride comfort of the vehicle is improved. In addition, the damping force curve having a desired damping pattern at the extremely low speed section may be obtained by appropriately selecting or changing the slit size (or the orifice size) of the slit disk provided in the auxiliary valve or by approximately selecting or changing the number and thickness of the disk(s). Therefore, the degree of freedom in tuning the damping force in the extremely low speed section may be increased.

While the embodiments of the present invention has been described with reference to the specific embodiments, it will be apparent to those skilled in the art that various changes and modifications may be made without departing from the spirit and scope of the invention as defined in the following claims.

What is claimed is:

1. A damping force controlling valve assembly for a shock absorber, comprising:
   a main body part of a retainer having an inlet passage connected to a high pressure side of the shock absorber;
   a main valve generating a damping force while resisting a working fluid flowing in through the inlet passage;
   a spool rod part interacting with a spool inserted thereinto and supplying a working fluid through a connection port to a back-pressure chamber provided at the rear of the main valve;
   a solenoid part controlling a position of the spool to adjust a pressure of the back-pressure chamber; and
   an auxiliary valve disposed upstream of the main valve to generate a damping force in an extremely low speed section in advance of the main valve.

2. The damping force controlling valve assembly according to claim 1, wherein the auxiliary valve comprises:
   a body in which a flow passage is formed to allow a working fluid flow from a high pressure side to the inlet passage; and
   a plurality of disks disposed under the body to cover the flow passage,
   wherein at least one of the disks is a slit disk.

3. The damping force controlling valve assembly according to claim 2, wherein the auxiliary valve comprises:
   one slit disk allowing the working fluid to pass through a slit thereof in the extremely low speed section; and
   one or more lower disks disposed under the slit disk and having no slit.

* * * * *